United States Patent [19]

Keene

[11] Patent Number: 5,450,122
[45] Date of Patent: Sep. 12, 1995

[54] IN-STATION TELEVISION PROGRAM ENCODING AND MONITORING SYSTEM AND METHOD

[75] Inventor: Leonard D. Keene, Merrimack, N.H.

[73] Assignee: A.C. Nielsen Company, New York, N.Y.

[21] Appl. No.: 796,008

[22] Filed: Nov. 22, 1991

[51] Int. Cl.⁶ .............................................. H04N 7/00
[52] U.S. Cl. ............................................. 348/1; 455/2
[58] Field of Search ............... 358/142, 147, 84, 185; 348/1, 2, 3, 4, 5, 722; 455/2; H04N 7/00, 5/222

[56] References Cited

U.S. PATENT DOCUMENTS

| | | | |
|---|---|---|---|
| 3,919,479 | 11/1975 | Moon et al. | 358/84 |
| 4,025,851 | 5/1977 | Haselwood et al. | 358/84 |
| 4,230,990 | 10/1980 | Lert, Jr. et al. | 358/84 |
| 4,547,804 | 10/1985 | Greenberg | 358/142 |
| 4,647,974 | 3/1987 | Bulter et al. | 358/185 |
| 4,677,466 | 6/1987 | Lert, Jr. et al. | 358/84 |
| 4,857,999 | 8/1989 | Welsh | 358/84 |
| 5,319,453 | 6/1994 | Copriviza et al. | 348/476 |

Primary Examiner—James J. Groody
Assistant Examiner—David E. Harvey
Attorney, Agent, or Firm—Marshall, O'Toole, Gerstein, Murray & Borun

[57] ABSTRACT

An in-station method and apparatus for encoding television programs, including commercials, with a digital identification code recorded on a selected video scan line which is not normally visible to the television viewer, and for verifying the proper airing of such programs by such television broadcast station. The encoding and decoding is performed at the broadcast station during its normal operating procedure. The program is encoded during the normal dubbing procedure when a program video tape is dubbed to a video cartridge for use by the broadcast station's library management system. The decoder is located either at the station at an off-air monitor, or at the transmitter, where it monitors the transmitted signal from the broadcast station and records the occurrence of encoded programs or commercials. The information generated is stored locally for later transmission to a host computer where the information can be combined with information from other broadcast stations and other databases.

27 Claims, 6 Drawing Sheets

IN-STATION TELEVISION PROGRAM ENCODING AND MONITORING SYSTEM AND METHOD

BACKGROUND OF THE INVENTION

This invention relates generally to in-station methods and apparatus for automatically encoding television programs and for acquiring information about the airing of such encoded television programs. This information may then be combined with information from other databases and reports may be compiled for use by broadcast stations, advertisers and advertising agencies.

The normal practice for monitoring and verifying the transmission of television programs, such as commercials, has been to video record a set of broadcast stations in each market and then manually to review and record the information from the video tapes for program or commercial occurrences. The information is then manually loaded into a computer data base manager for compilation into various reports for the broadcast station. Such auditing is very time consuming, laborious and expensive, so that only the larger markets are monitored full time, with smaller markets being monitored only one week of each month. Sample auditing of this type is unreliable for a number of reasons, including the fact that it is not always easy to identify a particular commercial uniquely or to differentiate it from a similar ones.

Furthermore, because the auditing is not automated, there is a considerable delay in reporting the information back to the broadcast stations and advertisers.

The television picture in the NTSC system used in the United States consists of a series of frames, each having 520 video scan lines. Each frame consists of two visually interlaced temporarily sequential fields of 260 scan lines each. Each field begins with a vertical sync pulse which is followed by 260 horizontal sync pulses that define the beginning of each video scan line of the field. The horizontal sync pulse for each line starting with line 10 is immediately followed by a 3.6 megahertz color burst signal which in turn is followed by a "black level" voltage level referred to as the "back porch." Starting with scan line 22, video information for the particular scan line follows the back porch. Lines 10 through 20 are referred to as the vertical blanking interval and are not used for television picture information. They may be used, if desired, by the television broadcast station for its purposes. Line 21 is used for closed captions. In most television receivers, lines 10 through about 30 are not visible to the viewer and are referred to as the "overscan region."

Various schemes have been proposed for automatically monitoring the airing of television programs, such as but not limited to commercials. According to some of these schemes, an identification code is recorded on one or more scan lines of the programs to be monitored in the overscan region. U.S. Pat. No. 4,805,020 to Greenberg describes one such system in which each field of the program is encoded with an identifying code by an encoding location before or at the time the tape is duplicated for distribution to broadcast stations in various markets. Remote monitoring systems in each market monitor a plurality of channels being transmitted and detect the encoded programs in order to assemble data on the time, duration, channel and quality of transmission of the program for use in preparing reports.

According to another such scheme, a pattern recognition system monitors the video signal or display of the program being broadcast and seeks to match the program with electronically stored program signals. These systems require large computer systems and are not reliable or accurate enough for fully automatic use.

The above automatic systems have not found wide commercial acceptance, for a number of reasons. For systems monitoring cable transmission, if the local cable goes down the entire monitoring system becomes inoperative. For systems monitoring broadcast signals, it is frequently difficult to find a location suitable for monitoring all stations in the area. Frequently it may be difficult to receive the signals of one or more broadcast station at a given location. Furthermore, it is necessary to go to every program originator to encode the programs to be monitored by the system. Since, for instance, there are a very large number of program originators for commercials, this becomes very cumbersome. There are often several handling steps between the encoding of the program and its ultimate broadcast or cable transmission by a television station. It is therefore difficult to ensure that the identification code will not be stripped out, written over, or otherwise made unusable. Furthermore, since the amount of information available to such a monitoring and verification system is limited, the reports that the system is able to generate are useful to only a limited number of potential customers.

There has been a long-felt need for a reliable, automated, quick and total accumulation of broadcast program and commercial occurrence information, which would serve the ends of a wide group of users, including broadcast stations, advertisers and others.

SUMMARY OF THE INVENTION

In accordance with the present invention, there is provided an in-station system and method for encoding and monitoring the transmission of television programs at a broadcast station which includes an input video tape drive for playing the tape containing a program received at the broadcast station, typically by satellite transmission or on video tape. An encoder is coupled to the output of the video tape drive for encoding the received program with identifying data on a selected line of the overscan region of the video information signal. An output video cartridge recorder is provided for recording the encoded program on a video cartridge which is compatible with the video tape library management system used by the station. A video tuner/decoder receives and monitors the composite signal transmitted by the broadcast station for detecting the presence of the identification codes on the encoded line of the transmitted signal. Database means are provided for storing information concerning the programs to be transmitted by the station and information from such tuner/decoder specifying the identity, time of transmission, duration and transmission quality of encoded programs transmitted by the station. Also provided are means for coupling the database means to a remote host computer for transmitting data concerning the programs to be broadcast and actually broadcast by the station for the preparation of reports by such host computer.

DETAILED DESCRIPTION

Figure 1:
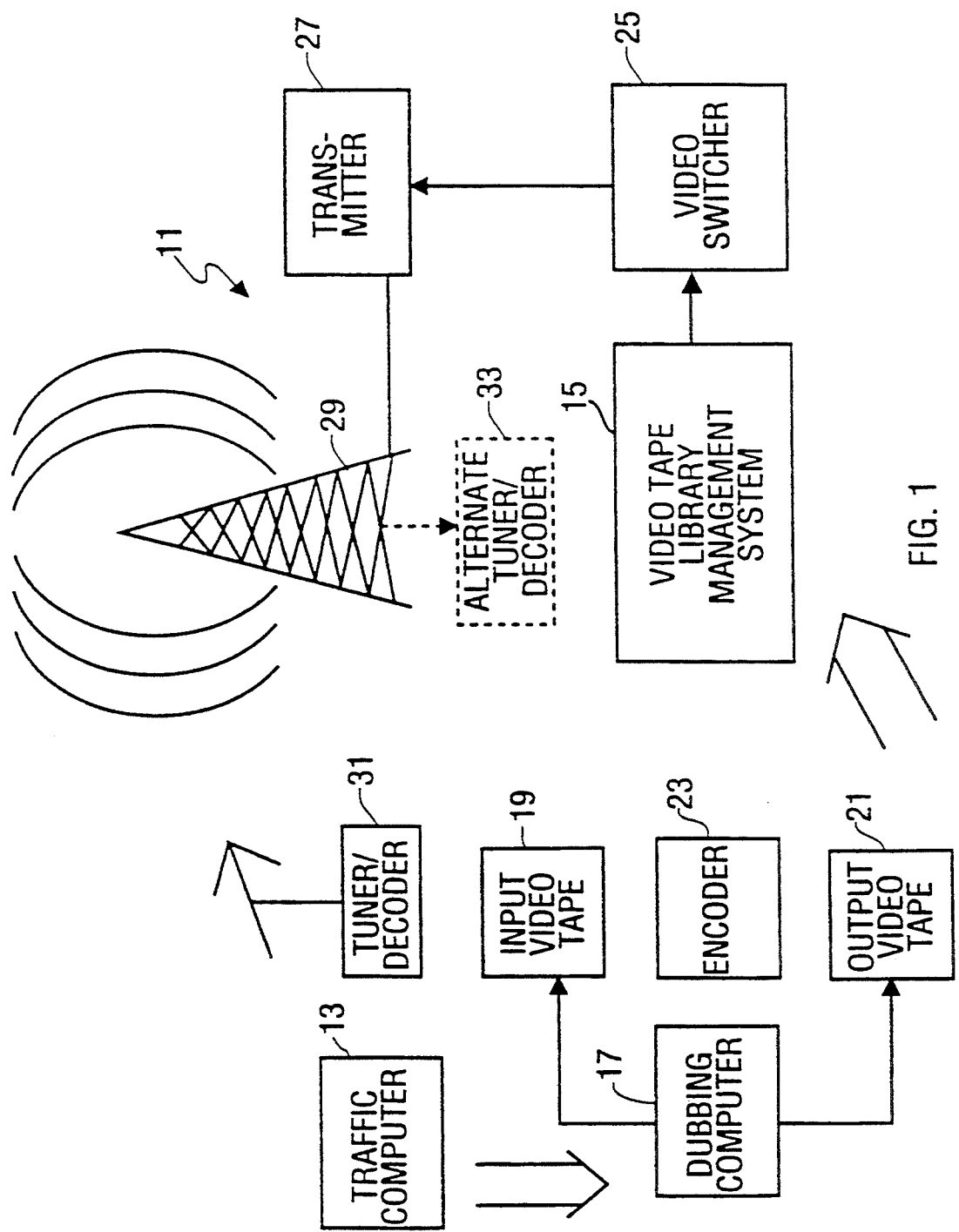
FIG. 1 is a block diagram showing the organization of a television broadcast station incorporating the encoding and monitoring system of the illustrated embodiment of the invention.

Referring now to FIG. 1 of the drawings, there is illustrated a block diagram showing the relevant portions of a television broadcast station 11. A program, which might be a commercial or other program material, may be received at a television station in the form of a video tape shipped to the station, or it may be transmitted electronically by satellite. In the case of satellite transmission, the program is recorded as received at the station on video tape. In either case, the video tape is delivered to the station's traffic department and information, which in the case of a commercial would typically include the title, advertiser, advertising agency, identifying codes and duration of the commercial, is entered into the traffic computer 13 and matched against data concerning a related contract or program schedule stored therein.

After being processed by the traffic department, in the case of a commercial, the video tape is sent to the engineering department to be dubbed onto a tape cartridge which is compatible with the station's video tape library management system 15. In the embodiment illustrated in FIG. 1, the dubbing is performed under the control of a dubbing computer 17 by an input video tape drive 19 which is coupled to a video cartridge recorder 21.

Depending on the equipment being used at the particular station, the tapes sent to be dubbed may be accompanied by a digital floppy disk or a handwritten dubbing information form. Alternatively, if the station is so equipped, the information from the traffic department may be transferred by local area network between the traffic computer 13 and the dubbing computer 17. Typically, such pertinent information about the program recorded on the video tape includes, in the case of a commercial, the ISCI code or episode code, the name and duration of the program, the advertiser, and the advertising agency. The traffic computer also normally specifies the number of the cartridge on which the tape is to be dubbed.

The dubbing computer 17 controls the input video tape drive 19, which is typically a reel-to-reel machine, and the output video cartridge recorder 21 to dub the program from the video tape onto a video tape cartridge. Information concerning a plurality of commercials is normally sent to the dubbing computer 17 at one time by the traffic department by means of the floppy disk or local area network. The dubbing operator calls up the data on the dubbing computer 17 relevant to the program recorded on the next video tape to be dubbed. This information is typically used to prepare a label for the dubbed cartridge on which the program is recorded and is stored in an inventory database managed by the dubbing computer 17. The label may contain various information depending on the station set up and equipment. The label information normally includes, however, the number of the cartridge assigned by the traffic computer in both human and machine readable form.

The dubbing computer 17, the input video tape drive 19 and the output video tape cartridge recorder 21 are normally standard components commonly used in television broadcast stations for dubbing incoming programs for the library management system 15. Tape drives suitable for use as the input tape drive 19 are available from suppliers such as Ampex, Sony and RCA. Cartridge recorders suitable for use as the output video tape cartridge recorder 21 are available from Sony, Ampex and other suppliers. The format and configuration of the video tape cartridge should be compatible with the video tape library management system 15 as will be described in more detail below. The dubbing computer 17 can typically be a 386 level personal computer or similar machine. The computer programs resident in the dubbing computer 17 for controlling the video tape drives 19 and 21 and for maintaining the inventory database are commercially available from the suppliers of video tape library management systems.

It is a significant feature of the in-station encoding and monitoring system of the present invention that its use and operation is largely transparent to station operators and does not require changes in normal procedures. In accordance with the preferred embodiment of the invention, the encoding of incoming programs with an identification code for later detection during broadcast is accomplished simultaneously with the dubbing of the program onto the cartridge by means of the encoder system 23 which is connected between the output of the video tape drive 19 and the input of the tape cartridge recorder 21 for encoding a selected line of the overscan region of the program's video signal with an identification code. The identification code and other information needed for the encoding is sent to the encoding system 23 by the dubbing computer 17. After being encoded, depending on how soon the program is to be broadcast and the capacity of the video tape library management system 15, the cartridges are either stored in the management system 15 or in the station's video cartridge library in a location determined by the number assigned by the traffic computer.

The video tape library management system 15 includes a plurality of video tape drives (typically 6 to 8), a storage system for storing a plurality of tape cartridges, and a robotic system for automatically selecting cartridges from the storage system and loading each selected cartridge onto one of the tape drives for playing the commercial recorded thereon. After the commercial has run, the robotic system removes the cartridge from the drive and returns it to the proper location in the storage system. An elaborate cartridge library management system can store and control as many as 1,000 tape cartridges, each having recorded thereon a single commercial. A typical network affiliate broadcast station will have about 2,000 tape cartridges in its inventory, each such cartridge storing a single commercial. An independent television broadcast station will typically have about 1,000–1,500 of such cartridges in its inventory. A primary network broadcast station may have 10,000 or more cartridges. Video tape library management systems are part of a television station's normal equipment and are available from various suppliers, such as Sony, La Kart and Ampex.

As used herein a "station" may refer to a broadcast or cable network originating station or to a network affiliate or independent broadcast station. "Broadcast" can refer to either broadcast or cable transmission.

Periodically, a play list is sent by the traffic computer 13 to the library management system 15 by floppy disk or local area network. The play list is an ordered listing the numbers of the video tape containing cartridges which are to be broadcast by the station during a particular time period. The library management system 15 compares the play list with its list of the cartridges which it has stored and prints out a list of the numbers of the cartridges which it is missing. If the library management system internal storage space is full, it selects the stored cartridges which it has not played for the longest period of time and ejects a sufficient number of those cartridges to make room for the needed new ones. As the new cartridges are inserted into the library management system, the robotic system reads the machine readable number (normally a bar code) and stores it in an available location.

The output of the video tape library management system 15 is connected to a video switcher 25, which selects among various inputs to be connected to the transmitter 27. When broadcasting commercials, the video tape management system is connected by the video switcher 25 to the transmitter 27. Other inputs to the video switcher 25 typically would include a network feed (for network affiliated stations), a connection from the station's newsroom, and a connection for video taped syndicated shows, among others. The transmitter 27 broadcasts the television programs by means of the antenna 29.

The signal broadcast by the antenna 29 is preferably monitored at the station 11 by means of tuner/decoder 31. The tuner/decoder 31 receives the broadcast signal from the antenna 29 and monitors the video signal to detect and decode the identification codes recorded by the encoder 23. The identities of the encoded programs and the time and duration of their transmission is stored by the tuner/decoder for transmission to a remote host computer.

In some installations, the station is not well located for receiving the broadcast signal from the antenna 29. In such instances, a tuner/decoder 33 may be connected to a tap on the antenna 29 to detect and decode the broadcast signal. As used in the claims, references to the "station" also include the site of the antenna 29.

Figure 2:
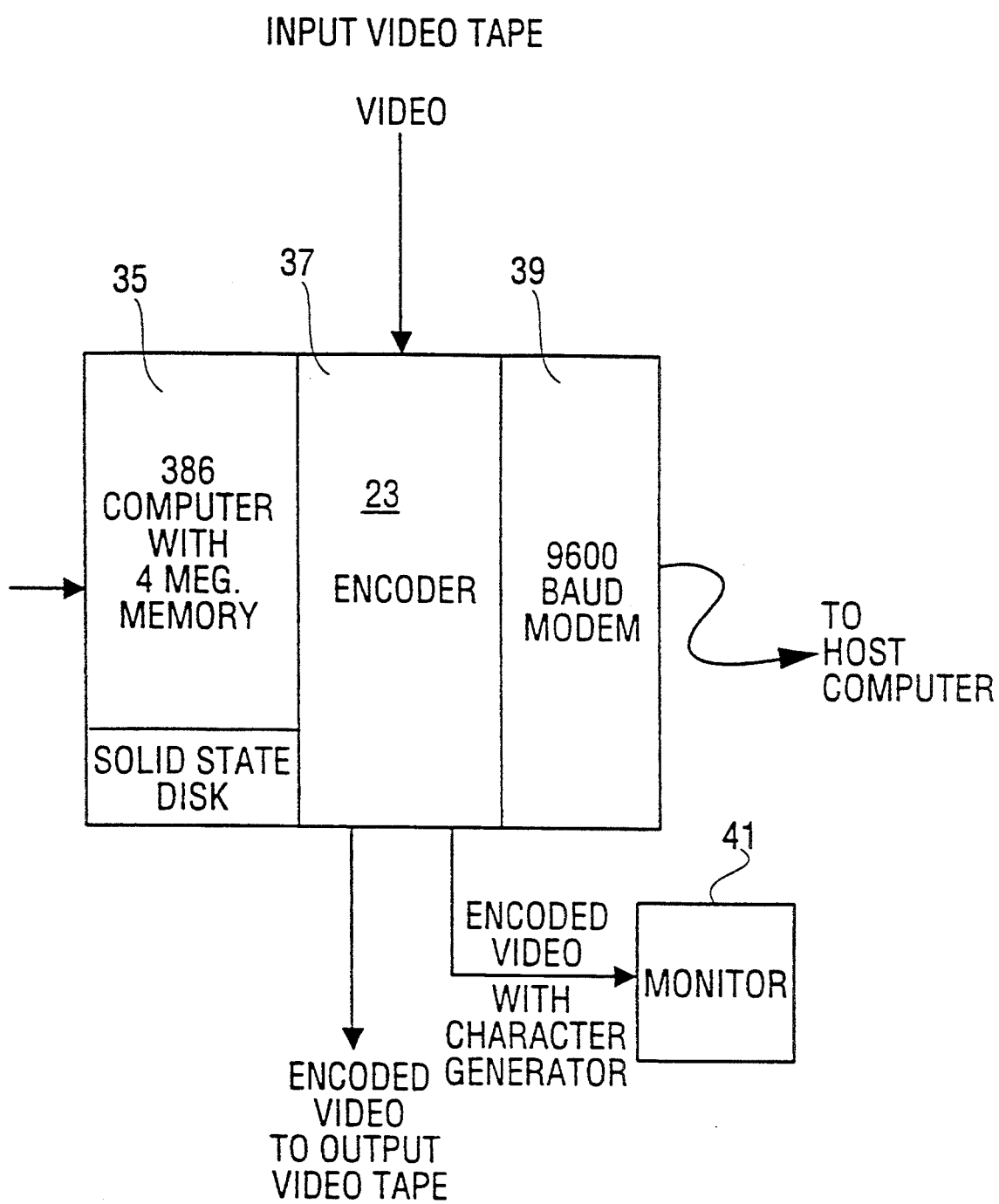
FIG. 2 is a block diagram of the encoder system in accordance with the illustrated embodiment of the invention.

Referring now to FIG. 2 of the drawings, there is illustrated a more detailed block diagram of the illustrated embodiment of the encoder system 23 of the invention. The encoder system 23 includes a 386 type personal computer or similar machine 35 preferably having at least 4-megs. of internal memory and a solid state disk drive. The encoder 37 may take the form of a circuit board installed in an expansion slot of the computer 35. A 9600 baud modem 39 is also connected to the computer 35, preferably as another expansion slot board. The modem 39 connects the computer 35 to the host computer.

The encoder 37 has an input terminal connected to the video output of the input tape drive 19 (FIG. 1) and an output terminal connecting the encoded video to the output video tape cartridge drive 21. Optionally, for the benefit of the dubbing operator, the encoded video signal may also be connected to a video monitor 41 which includes a character generator, for displaying both the video signal of the program being encoded and the alpha numeric display of the characters being encoded on the selected line.

Figure 3:
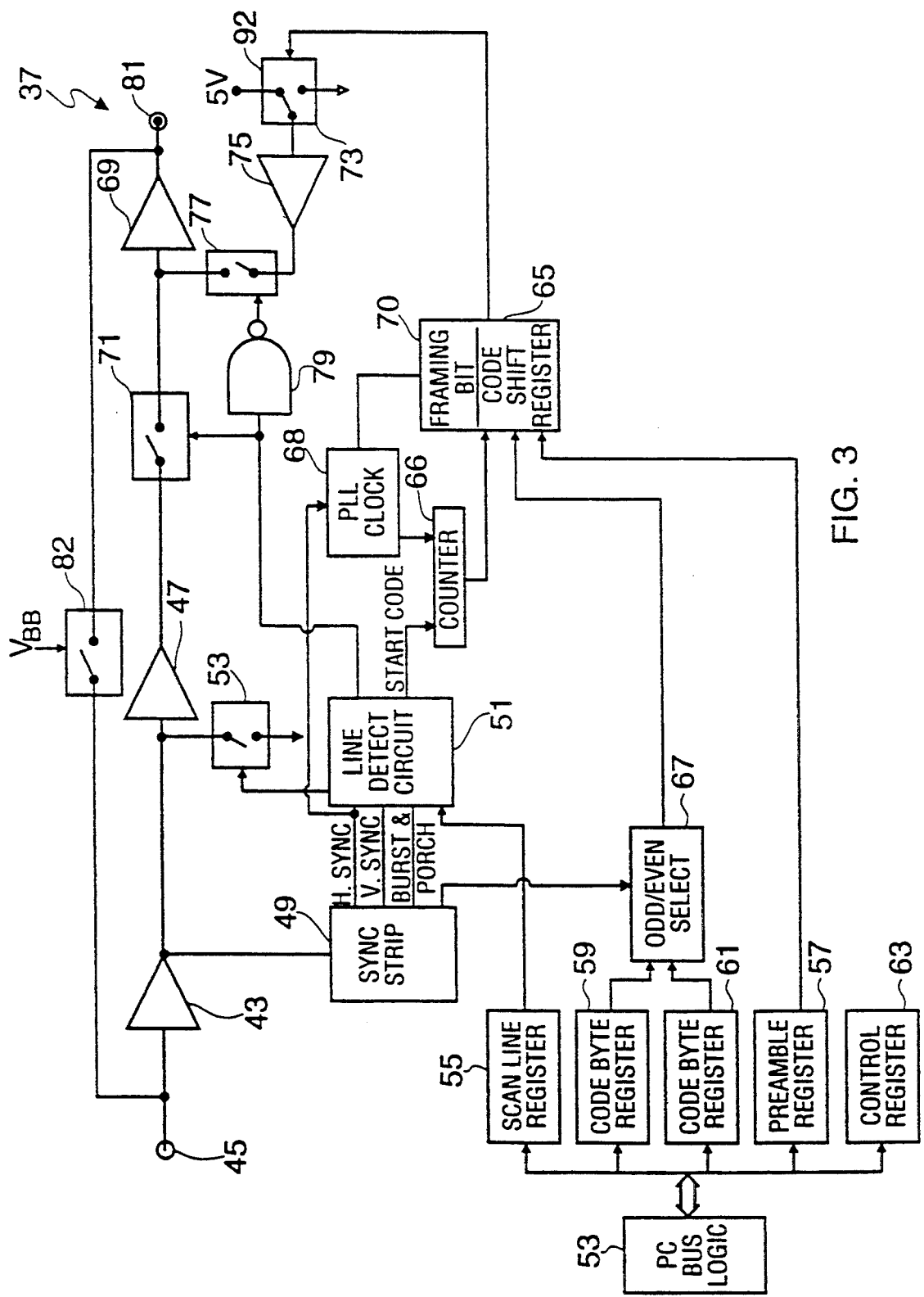
FIG. 3 is a schematic diagram of the encoder of the illustrated embodiment of the invention.

Referring now of FIG. 3 of the drawings, there is shown a schematic diagram of the encoder 37. The video signal from the input video tape drive 19 (FIG. 1) is connected to the input of the amplifier 43 through the video input terminal 45. The output of the amplifier 43 is connected to the input of a gain control amplifier 47 and to a sync strip circuit 49. Sync strip circuit 49 detects the presence of the vertical and horizontal sync pulses on the input video and develops outputs coincident in time with the presence of such signals on the input. The circuit 49 also develops other outputs temporally coincident with the location of the color burst and back porch. In the illustrated embodiment the sync strip circuit 49 is implemented by a NS 1881 semiconductor chip available from National Semiconductor Co. The sync strip circuit 49 also develops an output which indicates whether the odd or even field of each frame is present at the input 45. The outputs of the circuit 49 corresponding to the vertical sync, horizontal sync and color burst and back porch are connected to the line detect circuit 51. An output of the line detect circuit 51 is connected to the normally open grounding switch circuit 53 for selectively grounding the output of the amplifier 43 during the color burst and back porch signals.

The encoder 37 is connected directly to the bus of the computer 35 (FIG. 2) by the bus logic 53. The output of the bus logic 53 is connected to a series of registers which include the scan line register 55, the preamble register 57, two code byte registers and 59 and 61, each of which are 11 bytes long, and a control register 63. The scan line register 55 stores the number of the line in the video scan which is to be encoded by the encoder board 37 with the identification code in accordance with the invention. Preferably a line between numbers 10 and 20 is selected by the scan line register 55 for encoding under the control of the computer 35. The preamble register 57 stores a one byte preamble code. The code byte registers 59 and 61 are each used to store a 10 byte identification code and a one byte cyclic redundancy check code. The preamble, identification code and cyclic redundancy check byte are received from the computer 35 via the PC bus logic 53 for each program to be encoded. The control register 63 acts under the control of the computer 35 to enable the encoder board 37 to begin encoding the selected line of the video input signal.

The output of the scan line register 55 is connected to the line detect circuit 51. The output of the preamble register 57 is connected to the one byte code shift register 65. The outputs of the code byte registers 59 and 61 are also connected to the code shift register 65 through the odd/even select circuit 67. The odd/even output of the sync strip circuit 49 is connected to the odd/even detect circuit 67 to control the selection of which of the two code byte registers 59 and 61 is coupled to the code shift register 65 at any time. An output of the line detect circuit 51 is connected to counter 66 to enable the counter to count clock pulses from the phase lock loop clock 68. The output from the counter 66 is connected to the code shift register 65 for enabling it at the appropriate time. The horizontal sync pulse output from the sync strip circuit 49 is connected to the clock 68 for phase locking the clock 68 to the horizontal sync pulses which define the video scan line timing. The phase lock loop clock 68 divides the scan line into 128 bit times between successive horizontal sync pulses. Preferably the clock 68 includes a 12 Mhz clock oscillator whose frequency is divided to provide a very stable 2M hz output to the counter 66 and to the code shift register 65 for controlling their operation. The code shift register 65 includes a framing bit generator 70 for generating a one bit framing pulse to mark the beginning of the coding data for the scan line being encoded.

The output of the level controlling amplifier 47 is connected to the input of an amplifier 69 through a normally closed series switch 71. The series switch 71 is controlled by a control output from the line detect circuit 51. The shift register 65 has a serial code output which is connected to control the operation of a bi-level switching circuit 73 which develops an output of either 5 volts or ground depending upon the level of its input from the code shift register 65. The output of the switching circuit 73 is connected to the input of a level setting amplifier 75 whose output is connected to the input of the amplifier 69 through a normally open switch 77. The control output of the line detect circuit 51 is also connected through an inverter 79 to control the operation of the switch 77 in order to selectively connect the level setting amplifier 75 to the input of amplifier 69. The switch 82, which is held open by the $V_{BB}$ supply voltage, is connected between the input terminal 45 and the output terminal 81. Switch 82 closes when the $V_{BB}$ supply voltage is removed from the encoder 37 for bypassing the encoder 37 in such event.

In the preferred embodiment, the encoded scan line data consists of the framing bit followed by 96 bits of data. Each bit is either 1, represented by a 70 IRE voltage level or a 0, represented by a 0 IRE voltage level. In normal television practice, the voltage excursion of the video signal is arbitrarily divided into 100 levels with 100 IRE corresponding to the brightest white and 0 IRE corresponding to pure black. The 70 IRE used in the illustrated embodiment of the present invention to represent a binary 1 gives adequate differentiation from the 0 IRE level representing a binary 0 for easy detection while not risking overdriving the video circuitry.

The framing bit, which is always a binary 1, follows the horizontal sync pulse on the encoded scan line. The framing bit is recognized by the decoding circuitry as the beginning of an encoded scan line and initiates the decoding of the line. Following the framing bit is a one byte preamble code which, in the illustrated embodiment, is a two digit hexadecimal number which can be used to specify the significance of the data bytes on the remainder of the line as, for instance, identifying a particular commercial or syndicated program. Following the preamble code are ten bytes of data which identify the encoded program. A one byte cyclic redundancy check or error code follows the 10 data bytes. For commercials, the 10 data bytes are the 8 bytes international standard commercial identification ("ISCI") code which uniquely identifies the encoded commercial, followed by two bytes used to identify the advertising agency or provide other information. The first four bits of the ISCI code are capital alpha letters and the following four bytes are numbers.

It is preferred in the illustrated embodiment of the invention to encode both fields of each frame of the video information of the encoded program with the identification code. It is possible, however, to encode only the odd or even field of each frame, or to encode the two fields of each frame differently. If the two fields are encoded differently, then each frame could be encoded with 20 data bytes. It would also be possible to encode one field of each frame with the program identification and to use the second field as a counter. Such an arrangement is useful in cases such as that in which a commercial is embedded in a syndicated program and the broadcast station is contractually obligated to run the commercial even if the syndicated program is not. In such event it would be possible to identify such commercial based on the detection of the identification code of the syndicated program and the location within the program determined by the counter. If only a single field of each frame were encoded, it would also be possible to use the other field for different information, thereby permitting more efficient use of the scan line. The one byte preamble identifies which of the various possible encoding schemes is being used for a particular program.

In operation, the input video signal from the input video tape recorder 19 (FIG. 1) is amplified by the amplifier 43, level adjusted by the amplifier 47 and connected to the video output 81 through the normally closed switch 71 and the amplifier 69. The sync strip circuit 49 senses the output of the amplifier 43 and develops separate outputs in time correspondence to the presence of vertical sync pulses, the horizontal sync pulses, and the color burst and back porch signals on the video at the output of amplifier 43. The line detect circuit 51 receives the horizontal sync, vertical sync, and color burst outputs from the sync strip circuit 49 and counts the number of horizontal sync signals occurring after each vertical sync in order to count the lines of the video field as they are present at the output of the amplifier 43. The line detect circuit 51 compares the field line determined from the vertical and horizontal sync inputs with the scan line number stored in the scan line register 55 to determine when the video scan line to be encoded is present at the output of the amplifier 43.

The line detect circuit 51 is enabled upon the sensing of the horizontal sync signal of the scan line from the sync strip circuit 49 to be encoded such that the trailing edge of the horizontal sync pulse causes the line detect circuit 51 to close the normally open switch 53 until the trailing edge of the back porch output pulse from the sync strip circuit 49, at which time the switch 53 is opened again. The closing of the switch 53 grounds the output of the amplifier 43, thereby blocking the transmission of the 3.6 Mhz color burst signal which otherwise would generate noise on the encoded signal. The end of the back porch of the line to be encoded also causes the output of the line detect circuit 51 connected to the switch 71 to go high for the remainder of the scan line. This opens switch 71 and closes switch 77 for the remainder of the scan line, thereby disconnecting the amplifiers 43 and 47 from the video output 81 and connecting the code switch circuit 73 to the video output 81 through the amplifiers 75 and 69.

At the same time as it closes the switch 53 and opens the switch 71, the line detect circuit 51 generates the Start Code signal for initiating the encoding of the remainder of the scan line. Since the phase lock loop clock 68 divides the scan line into 128 bit spaces and the information to be encoded onto the line occupies only 97 bit spaces, there is some extra room on the scan line. In order to allow for possible phase shift resulting, for instance, from time base corrections performed by the television broadcast station, it is preferred to position the information encoded on the scan line roughly in the middle of the available space. This objective is accomplished on the illustrated embodiment of the invention by using the counter 66 to delay the beginning of the encoded portion of the scan line so that approximately equal space exists between the beginning and end of the encoded data and the preceding and following horizontal sync pulses, respectively.

The Start Code signal generated by the line detect circuit 51 enables the counter 66 to begin counting bit time defining clock pulses from the clock 68. In the preferred embodiment, the counter 66 generates an output to the code shift register 70 after counting 32 clock pulses, thereby defining a 4 byte wide space between the point where the switch 71 is open and switch 77 closed and the beginning of the encoding.

Once it is enabled by the output of the counter 66, the code shift register 65 begins serially transmitting code data bits, one for each clock cycle of the clock 68, to the control input 72 of the switching circuit 73. At the first clock cycle after the counter 66 has been enabled, the framing bit generator 70 causes a binary 1 to be transmitted to the switching circuit 73.

At the beginning of each field the code shift register 65 is initially loaded with the contents of the preamble register 57. During the second through ninth clock pulses received from the clock 68 after being enabled by the counter 66, the code shift register 65 serially transmits the preamble code to the switching circuit 73. Thereafter, depending on whether the odd or even field is present at the video input terminal 45, the odd/even select circuit 67 controls the transfer of code bytes from either code byte register 59 or 61 to the code shift register 65. The bytes are shifted from the code byte registers 59 or 61 one byte at a time in parallel. The bits of the first code byte are shifted out of the code shift register 65 during the 10th through 17th clock pulses received by the code shift register 65 from the clock 68 after being enabled by the counter 66. This process of transferring the code bytes one at a time to the shift register 65 and then serially transmitting those bits to control the switching circuit 73 continues until all ten code bytes and the cyclic redundancy check byte have been transmitted.

For each binary 1 bit transmitted by the code shift register 65, the control input 72 of the switching circuit 73 is high for the entire bit time. This causes the switching circuit 73 to connect its output to the five volt supply. When a zero bit is transmitted from the code shift register 65 the control input 72 is held low for the entire bit period, which in turn causes the output of the switching circuit 73 to be connected to ground. The amplifier 75 is adjusted such that when its input is at five volts, its output is at 70 IRE. When its input is grounded, the output is at 0 IRE. The output of the amplifier 75 is connected to the video output 81 of the encoder 37 through the amplifier 69. Thus, the data from the code shift register 65 is transmitted as a binary bit stream to the video output 81 of the encoder 37 in which a 1 is a 70 IRE level and a 0 is a 0 IRE level.

Figure 4:
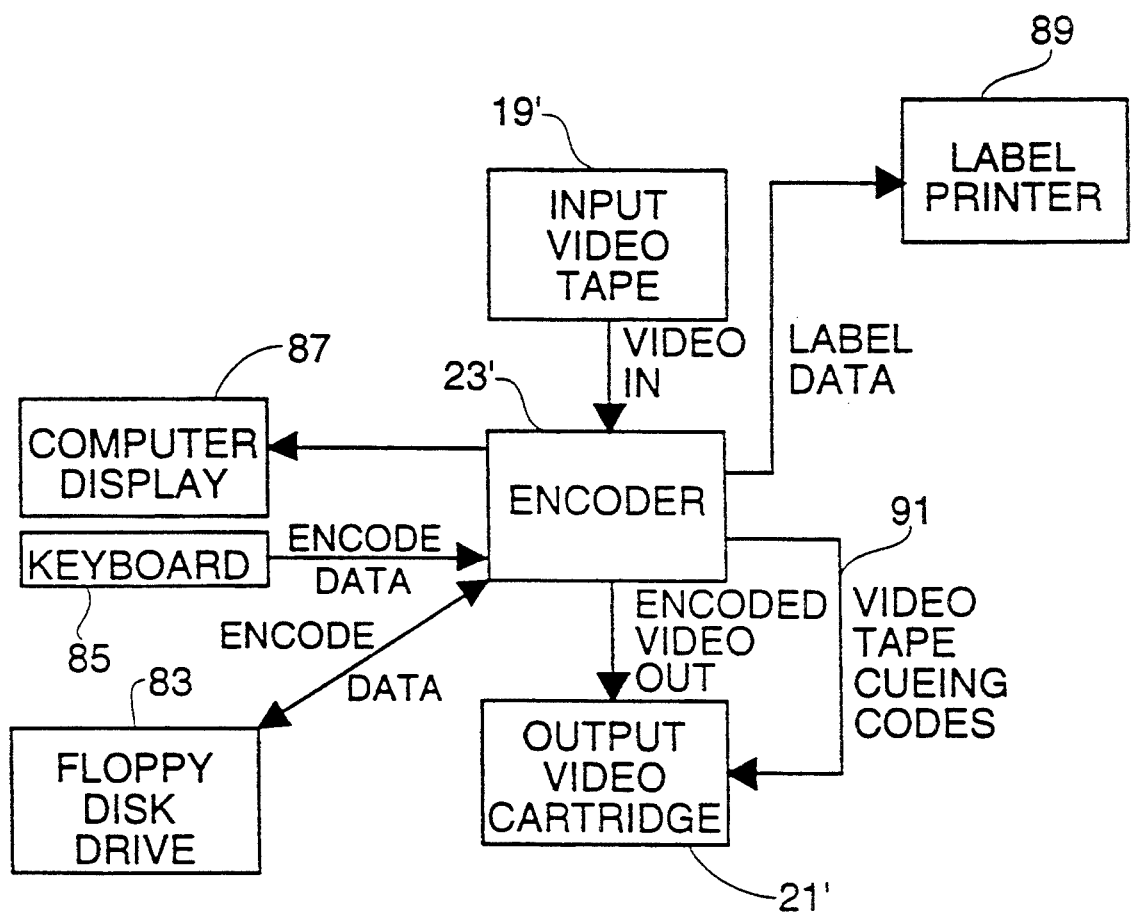
FIG. 4 is a block diagram of an alternative encoding arrangement in accordance with the invention.

Referring now to FIGS. 1 and 4 of the drawings, some television broadcast stations do not use a dubbing computer to control the dubbing of the video tape onto a video tape cartridge. In such stations, the alternative encoding system 23' may be used to encode television programs in accordance with the invention. The encoding system 23 is substantially identical to the encoding system 23 illustrated in FIGS. 1 and 2 of the drawings. In the case of the embodiment of FIG. 4, however, the functions of the dubbing computer 17 are taken over by the computer which forms part of the encoding system 23'. In this alternative system the information concerning the programs to be encoded is entered into the computer of the encoding system 23' by means of either of floppy disk drive 83 or the keyboard 85. Display 87 is connected to the computer in the encoder system 23' for use by the dubbing operator. A label printer 89 is connected to the computer in the encoder system 23' for preparing labels identifying the contents of the video cartridges being recorded at the video cartridge drive 21.

In certain stations it is necessary to enter video tape queuing codes at the beginning of the tape in the video tape cartridge in order to give the station master control board operator queuing information that confirms that the correct cartridge is loaded prior to airing.

In such installations, an output 91 from the computer in the encoder 23' is connected to the output video cartridge recorder 21' for sending video tape cuing codes to the cartridge recorder for being recorded on the initial portion of the tape in the cartridge.

Referring now to FIG. 3 of the drawings, there is illustrated a block diagram of the decoder system 93 in the tuner/decoder 31 or 33 (FIG. 1). The decoder system 93 is similar in basic configuration to the encoder system 37 (FIG. 2). It includes a 386 level personal computer 95 preferably having at least 4 Megs. of internal random access memory and a solid state disk 96. The decoder board 97 is preferably configured to be plugged into one of the expansion slots of the computer 95. A 9600 baud modem 99 is also preferably connected in one of the expansion slots of the computer 95. The decoder system 93 receives the video input signal from the tuner/decoder system 31 or 33 and monitors all video scan lines between lines 10 and 50 of each field of the video signal. When the decoder system 93 sees one such line encoded in accordance with the encoding arrangement of the illustrated embodiment of the invention, it separates the data on the encoded scan line from the composite video signal and assembles the scan line data records for each encoded program detected. Such records are stored in the solid state disk drive 96 in a database managed by the computer 95. These records also include data specifying the time at which the program commenced and the duration of the program in terms of the number of consecutive fields on which the data is encoded. The record for each encoded program detector also preferably includes the number of the encoded line and a quality index for the encoded video signal. These record are stored on the solid state disk 96 under control of a database management system for later retrieval by the host computer through the modem 99. In accordance with the invention, the stored data is preferably retrieved from both the encoder system 23 and the decoder system 93 on a daily basis by the host computer which is normally at a remote site. The data from a particular station may be combined with similar data from other stations in the same or other markets to create an occurrence database of programs which are run locally and nationally.

The data from the decoder system 93 is also sent to the traffic computer 13, preferably by a local area network, for use by the station traffic department in correlating the programs and commercials actually transmitted with contracts for billing and monitoring purposes.

The quality index is determined by a programmable algorithm according to which the failure to find a encoded line on a preselected number of consecutive frames, typically set at about 60, or the absence of color burst results in a reduced quality index. If the identification code is missing from more than the preselected number of consecutive frames, the encoded video following the break is treated as a separate program.

It is also possible to perform an audio check, for instance by comparing a fast fourier transform signature of the received audio signal with that of the original program.

The decoder system 93 can also receive and store the as-aired log from the station control console computer by monitoring the output of the control console computer to an as-aired printer which printer prepares reports of the as-aired log. The as-aired log may be later retrieved via the modem 99 by the host computer. The as-aired log allows automatic testing of occurrences of commercials and programs against the decoder occurrences recorded. This testing at the host computer assures accuracy of the database information and eliminates problems with last minute changes in commercial schedules that do not always get recorded at the control console computer. The availability of the as-aired log information also allows greater differentiation of the source of a common commercial use by both local, regional and national advertising agencies.

The information at the host computer is combined with information from other databases and various statistical reports are compiled for use by the broadcast stations, advertisers and advertising agencies either by hardcopy or on-line access to the host computer.

Figure 5:
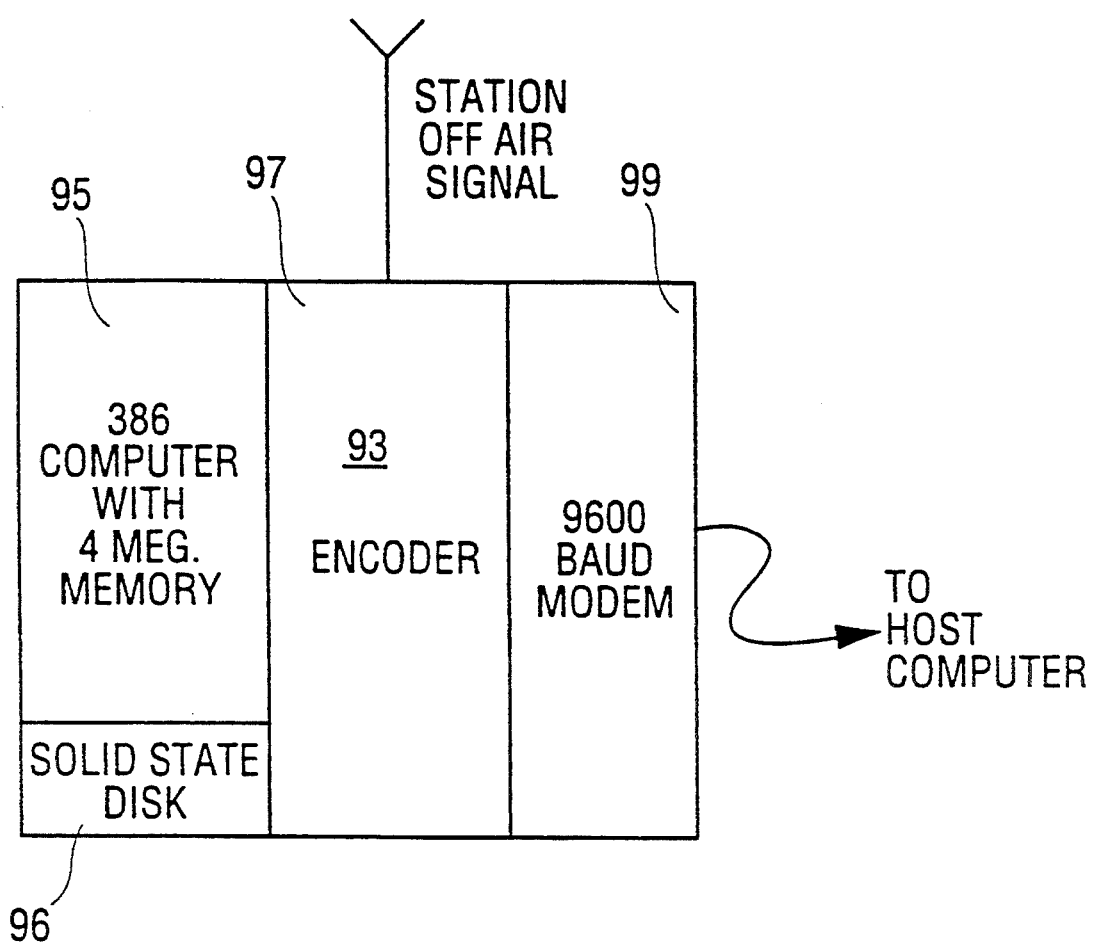
FIG. 5 is a block diagram of the decoder system in accordance with the illustrated embodiment of the invention.
Figure 6:
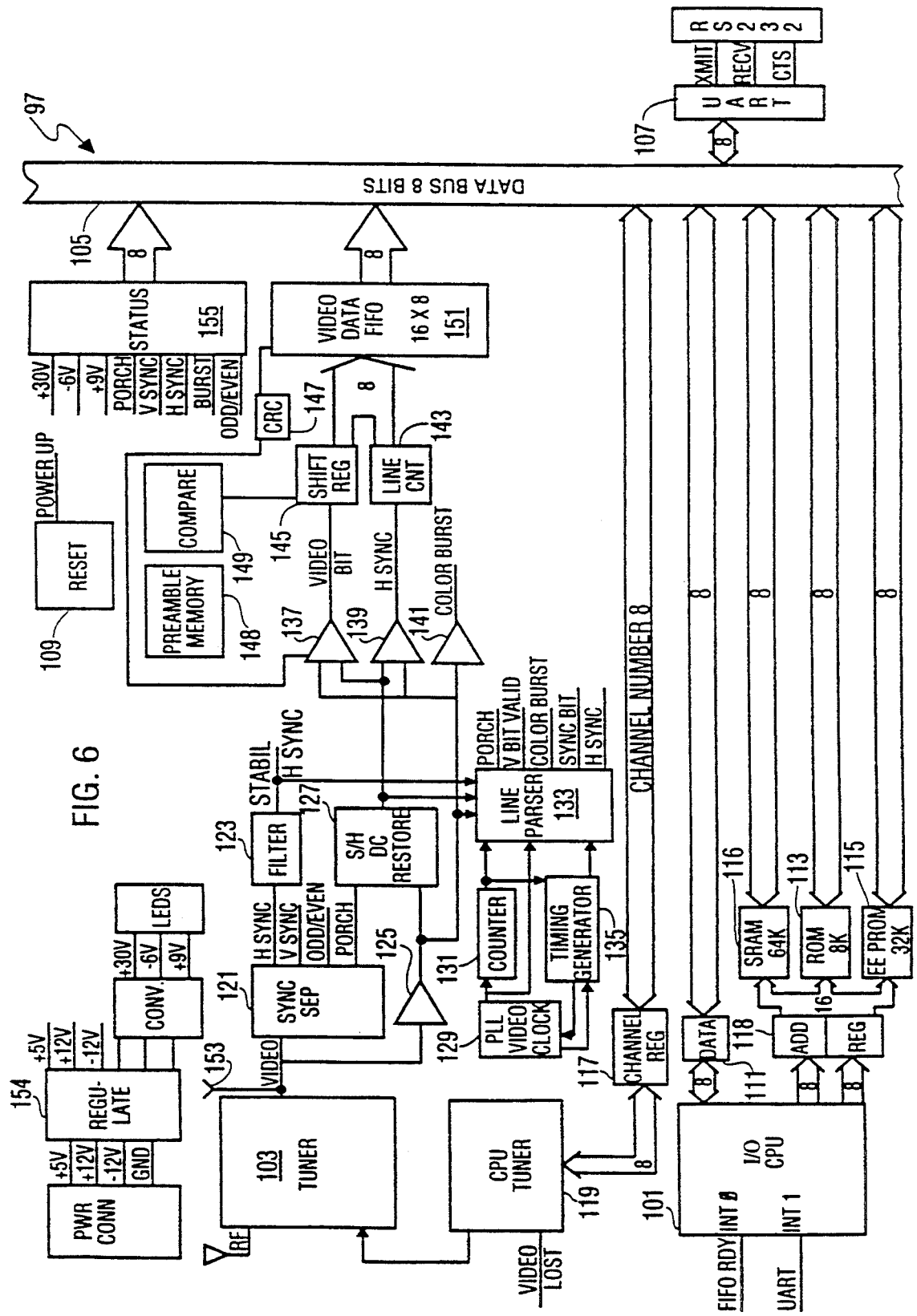
FIG. 6 is a schematic diagram of a decoder in accordance with the invention.

Referring now to FIG. 6 of the drawings, there is illustrated a schematic diagram of the decoder 97 of the illustrated embodiment of the invention. The decoder 97 consists of a control portion made up of the I/O CPU 101 and associated registers and memory, and a tuner/decoder section made up of the tuner 103 and the associated decoding circuitry which receives the television signal broadcast by the transmitting station, determines the presence of a scan line encoded in accordance with the illustrated embodiment of the invention and decodes the information present on the scan line. An 8 bit data bus 105 interconnects the various circuits on the decoder board 97 and acts as the communication path among them. Communication between the decoder 97 and the computer 95 of the decoder system 93 (FIG. 5) takes place via the universal asyncronous receive and transmit circuit ("UART") 107.

When power is turned on, the reset circuit 109 generates a power-up signal which resets the various circuits on the decoder 97 to an initial condition.

The power-up signal causes the I/O CPU 101 to go to the "boot mode" in which it is able to communicate with the computer 95 through the UART 107, but is otherwise waiting. The I/O CPU 101 receives instructions from and transmit data to the computer 95 through the data register 111 and the data bus 105 on an 8 bit wide path. The 8K ROM 113 stores code for interpreting the commands received from the computer 95 when the I/O CPU 101 is in the boot mode. The boot mode commands received from the computer 95 cause the I/O CPU 101 to address the locations in the ROM 113 which store the microcode needed to interpret and execute each command. The I/O CPU 101 addresses the ROM 113, the 32K EEPROM 115 and the 64K SRAM 116 through the address register 118. Since the addressing of these memories requires 16 bits, two 8 bit bytes are sent by the I/O CPU to the address register 116.

The boot mode commands include a "Send Status" command which causes the I/O CPU 101 to tell the computer 95 whether it is in the boot or operational mode. The "Go Operational" command causes the I/O CPU 101 to switch from the boot mode to the operational mode.

The UART 107 is connected to the computer 95 through an RS 232 interface and serially transmits or receives data one byte at a time to or from the computer 95. Information is sent by the I/O CPU 101 to the computer 95 one byte at a time in response to the receipt from the computer 95 of "clear to send" signal Ion the CTS line to the UART 107. The receipt of the CTS signal causes the UART 107 to generate a first level interrupt to the I/O CPU 101 which in turn causes the I/O CPU 101 to address the SRAM 116 to send the next data byte to the computer 95 through UART 107. This mode of operation permits the computer 95 to handle other matters when it needs to without risk of compromising the integrity of the data which is being sent to it by the I/O CPU 101.

When the I/O CPU 101 enters the operational mode, it shifts to the EEPROM 115 to interpret commands received from the computer 95 and sends the channel number received from the computer 95 as part of the Go Operational command to the channel register 117 through the data register 111 and bus 105. The Go Operational command also includes a filter byte which programmatically controls I/O CPU 101 on the criteria for recognizing the reception of encoded fields as the beginning of an encoded program, and for determining whether a series of encoded fields represents one or more programs. The first two bits of the filter byte determine how many successive encoded fields must be found before the I/O CPU 101 determines that an encoded program is being received. These bits are normally set such that two successive encoded fields (one frame) are required before the beginning of a program is recognized, but if the station is particularly noisy, the filter byte can specify a larger number, eg. four fields (two frames), which must be found before the beginning of a program is recognized. The system time stamps the start of the program based on the first encoded field but must recognize the required number of successive encoded fields before the reception of an encoded program is confirmed. The other six bits of the filter byte are used to set the number of dropped fields which can occur before the information following the dropped fields is considered to be a different program. Typically, these bits are set to specify 180 fields (3 seconds) but different numbers of fields can be set as desired. If the filter bits are set at 180 fields, and the dropping of 180 or fewer fields occurs, the encoded segments before and after the dropped fields are considered to be a single program but the quality index is decreased. This of course assumes that the fields before and after the gap are encoded with the same codes. If more than 180 fields are dropped in succession, the two encoded segments proceeding and following the dropped fields are considered to be two separate programs.

The output of the channel register 117 is connected to tuner CPU 119 which controls the tuner 103. The channel number is stored in the channel memory portion of the tuner CPU 119 where it is used to tune the tuner 103 to the proper frequency. In the event that the station to which the tuner 103 is tuned goes off the air, the Video Lost input to the tuner CPU 119 is set. In response to this signal, the tuner CPU 119 causes the tuner 103 to scan back and forth over a 2 megahertz band centered on the channel frequency in order to find the video signal as soon as it comes back on. Scanning over a 2 megahertz band enables the system to be used with cable stations which may be transmitting a particular channel on any one of three different frequencies within a 2 megahertz band about a nominal center frequency, depending upon the particular cable network arrangement. In a broadcast station, narrower scanning bands could be used because the station frequency never varies more than about 10 kilohertz from the nominal channel frequency.

The video output of the tuner 103 is connected to a sync strip circuit 121 which may be identical to the sync strip circuit 49 of the encoder 37 (FIG. 3). The sync strip circuit 121 senses the vertical sync and the horizontal sync pulses on the video input and generates output pulses at times of the vertical and horizontal sync pulses and of the back porch for use in the decoding operation. The sync strip circuit 121 also generates an output specifying whether the odd or even field is present. The horizontal sync output is connected to a filter 123 which generates a squared stable horizontal sync output for use by the line parser circuit 133.

The video output from the turner 103 is also connected through the amplifier 125 to the sample and hold DC restore circuit 127. The back porch output of the sync strip circuit 121 is also connected to the sample and hold circuit 127 to cause it to sample the voltage level of the video signal at the output of amplifier 125 at back porch time and hold that level until the back porch of the next video line in order to provide a DC reference level for decoding the information on the video signal. The DC level in the decoder 97 of the received video signals can float over a relatively wide voltage range. The sample and hold circuit 127 provides a reference equal to the back porch voltage level, which is substantially 0 IRE.

The phase lock loop video clock 129 may be similar to the clock 68 in the encoder circuit, (FIG. 3). The clock 129 generates a 2 Mhz output which is phase locked to the H sync output of the sync strip circuit 121 in order to divide the video line into 128 bit times from H sync to H sync. The output of the video clock 129 is connected to the counter 131 which is in turn connected to the line parser circuit 133. The counter 131 counts the 128 clock pulses on each video line and is reset at the end of each line. The line parser 133 also receives the video output from the amplifier 125. The line parser 133 monitors each video line to determine whether the various portions of the line are present and in the appropriate time slots. It develops outputs for the H sync, the color burst and the back porch which are high if those portions of the video line are present and in the appropriate time slots as determined by the counter 131, and are low if they are not present or are not in the appropriate time slot. The V bit valid output of the line parser 133 is high during the period that valid data bits can be present on the encoded scan line. This occurs from the end of the back porch time until close to the end of the scan line.

The timing generator circuit 135 receives a 12 Mhz output from the video clock and the V sync and H sync pulse outputs from the sync strip circuit 121, and generates a plurality of timing pulses for controlling the timing of various parts of the decoder 97. One such output is a sampling pulse which is generated at the middle of each of the 13 bit time periods after porch time for lines 10 through 50 of each field. This sampling pulse output is connected to the line parser 133 and causes it to sample the video level at the center of each such bit time period to look for the framing bit. When the line parser 133 sees a high video voltage level at the sampling time, it sets its sync bit output high, tentatively indicating that a framing bit is present.

The video output of the amplifier 125 is also connected to an input of the video bit comparitor 137, the H sync comparitor 139 and the color burst detector 141. The output of the DC restore circuit 127 is connected to the other inputs of the comparitors 137 and 139. The output of the H sync comparitor 139 is connected to the line counter circuit 143. The output of the video bit comparitor 137 is connected to the shift register 145 and to the cyclic redundancy check circuit 147.

A serration detector included in the timing generator circuits 135 generates an output, referred to as "Large Kick" during the serration time the serrations are the H sync pulses that occur during the first 10 lines in the vertical blanking interval. They are more closely spaced in time than the H sync pulses for the other scan lines and the first five of them are positive going. The beginning of the serration time is contemporaneous with the V sync pulse. The serration detector recognizes the serrations by the fact that the counter 131 does not get close to the 128 count between adjacent H sync pulses. The Large Kick signal disables the phase lock loop in the clock 129 and the line parser circuit 133 and resets the line counter 143 to 10. At the end of the serration, the phase lock loop and the line parser circuit 133 are once again enabled and the line counter 143 begins counting H sync pulses starting with line 11. The comparitor 139 is able to recognize H sync pulses by virtue of the fact that they are the only negative going pulses.

The sync bit output from the line parser 133 is connected to the shift register 145 for enabling the shift register 145 to begin shifting in the code bits which immediately follow the framing bit in successive bit times. To confirm that the framing bit detected by the line parser 133 is actually the first bit of an encoded line and not just ordinary video, the decoder 97 compares the first byte following the framing bit with the preselected preamble codes stored in the preamble memory 148 to determine whether a valid preamble is present. The comparitor 149 is connected to the first bit location in the shift register 145. During the first bit time following the sync pulse from the line parser 133, the comparitor 149 compares the first video bit with the first bits of the preambles stored in the memory 148 and eliminates the stored preambles which do not match. During subsequent bit times the comparitor 149 compares the successive bits in the first location in the shift register 145 with the corresponding successive bits of remaining matching stored preambles until all stored preambles are eliminated or a match is found. If no match is found, the line is considered to be ordinary video and the shift register 145 is disabled. In such event the line parser 133 continues to look at subsequent lines seeking to find another potential framing bit.

If a match is found, the preamble byte stored in the shift register 145 is transferred in parallel into the first register of the Video Data FIFO 151. The Video Data FIFO 151 contains a 16 eight-bit registers and may be implemented as an AM 29525 integrated circuit which is manufactured by AMI Inc. Only 13 of the 16 registers are used in the illustrated embodiment to store the information from the encoded line and the number of the encoded line.

The 10 identifying eight-bit bytes and the CRC byte on the encoded line of the received program are then serially shifted into the shift register 145 through the video bit comparitor 137. When each eight-bit byte is shifted into the register 145, it is transferred in parallel into the next available register of the Data FIFO 151 until all 10 information bytes and the CRC byte are resident in the registers of the FIFO 151.

The sync bit from the line parser 133 also enables the cyclic redundancy check circuit 147 to begin receiving the video bits of the encoded line. At the end of the 12th byte of the encoded line, which corresponds to the end of the cyclic redundancy byte, the output of the cyclic redundancy check circuit 147 is zero if the data on the encoded line is correct. If an error has occurred, the output of the cyclic redundancy check circuit 147 is other than zero at the end of the last bit time of the encoded CRC byte.

When the Video Data FIFO 151 transfers the CRC byte from the shift register to the 12th register of the FIFO 151, it also disables the shift register 145, stops the reading of video bits by the cyclic redundancy check circuit 147, and loads the contents of the line counter 143 into the 13th FIFO register. The FIFO 151 then enables the cyclic redundancy check circuit 147 such that, if its output is zero, it generates a level zero interrupt (referred to as FIFO RDY) to the I/O CPU 101. In response, the I/O CPU 101 causes the contents of the FIFO 151 to be transferred to the SRAM 116 via the data bus 105. Thus, the SRAM 116 receives the information recorded on the selected scan line of the encoded television program along with the number of the line on which it was encoded.

In the event that the output of the cyclic redundancy check circuit 147 is not zero at the end of the receipt of the encoded line, the data stored in the FIFO 151 is not transferred to the SRAM 116 but is discarded. If this happens at a field of an encoded program, it is treated as a dropped field for purposes of the quality index calculation.

If the contents of the line counter 143 reaches 50 without any encoded line having been found, it ceases counting and disables the shift register 145. In such case the field being received is assumed not be encoded.

The encoded line data received by the SRAM 116 is compiled by the I/O CPU 101 into a series of records, one for each encoded program decoded by the decoder 97. Each such record contains the identification data for the encoded program, the start time and the duration of the program in terms of the number of encoded fields which it contains and the quality index for the program.

Periodically the computer 95 commands the decoder 97 to send to the host the information stored concerning the encoded programs which have been monitored by the decoder 97. The computer 95 sends to the I/O CPU 101 the "Read Status" command which causes the I/O CPU 101 to send back a status byte. The first bit of the status byte specifies that the I/O CPU 101 is in the operational mode. The second bit, referred to as the "pending" bit, tells whether or not there is at least one complete program which has been monitored and the record of it stored in the SRAM 116. The third bit of the status byte specifies whether the I/O CPU 101 is currently decoding a program. If the pending bit is set, the computer 95 can command the I/O CPU 101 to send the pending records from the SRAM 116 to the computer 95 starting with the earliest record.

The SRAM 116 is programmatically organized in a series of successive registers, each clapable of storing the record of one monitored program. Addresses for the registers in the SRAM 116 are arranged in a ring, such that if the address of the highest numbered register is incremented, the address becomes that of the lowest numbered register. The I/O CPU 101 maintains in one memory location the address of the register in SRAM 116 containing the next pending record to be sent to the computer 95. A second location stores the address in the SRAM 116 of the register in which the record of a program presently being decoded is being compiled, or if no program is being decoded, the address of the next available register in SRAM 116 in which a new encoded program record can be stored.

When the computer 95 instructs the I/O CPU 101 to send the pending records of completed decoded programs to it, the I/O CPU 101 successively sends the pending records via the UART 107 to the computer 95, incrementing the address of the register for each successive pending record, until the address of the register storing the next pending record becomes equal to the address in the second location of the register where the record of the next program to be decoded is to be stored. This condition occurs when the registers in SRAM 116 are empty.

When, during reception of successive encoded programs, the address in the second location becomes equal to that of the pending record in stored the first location, the SRAM 116 is full. If additional programs are decoded when the registers in the SRAM 116 are full, the data for the newly received programs is discarded. The SRAM 116 can store the records of up to 1440 programs in its registers, which corresponds to two full days of 15 second encoded programs. Since the computer 95 normally retrieves the records of the decoded programs from the decoder 97 at least once per day, the problem of the registers of the SRAM 116 becoming full normally does not occur.

The decoder 97 is also capable of decoding base band video signals at the station. If the channel number sent to the channel register 117 by the I/O CPU 101 calls for channel 0, the tuner CPU 119 shuts off the tuner 103 and the base band video is received at terminal 153. The received base band video is connected to the sync strip circuit 121 and the amplifier 125, and it is thereafter treated in the same manner as video signals received by the tuner 103.

The status register 155 is an 8 bit register which can be read by the I/O CPU 101 thereby allowing the I/O CPU to monitor the operation of important components of the decoder 97. The +30, −6 and +9 volt supplies are generated on the decoder board by the regulator 154. The porch signal is received from sync strip circuit 121. The color burst time signal from the line parser 133 and the color burst pulse on the output of the detection circuit 141 are connected to an AND gate (not shown) whose output is connected to the burst valid input of the status register 155. The odd/even output of the sync strip circuit 121 is connected to the odd/even input of the status register 155. The contents of the status register 155 are polled by the SRAM 116 frequently during operation of the decoder 97.

In embodiments of the invention where only one field per frame is encoded, the odd/even output of the sync strip circuit 121 can be used to enable the line counter 143 and shift register 145 only during the odd or even field as appropriate. In systems where the odd and even fields are encoded differently, the odd/even output of the sync strip circuit 121 can also be used to differentiate between the two fields.

While the illustrated embodiment of the invention has been described in connection with programs recorded on video tape and dubbed onto video tape cartridges, it is apparent that other media could be used for storing the programs both before and after encoding. For instance, a video disk, particularly those with a read/write capability could be used as the program storing medium. As used herein, the references to video tape or video tape cartridges are intended to apply equally to other such media whether now in use or introduced in the future.

The system of the present invention has many advantages over those proposed in the prior art. The fact that it is an in-station system in which the encoding, and preferably both the encoding and decoding is performed locally at the station permits the particular line to be encoded to be selected so as not to interfere with other operations of the station and to avoid problems with stripping. It is possible also to use the system to monitor programs broadcast by a station which programs have been encoded at the originating network or syndicator. The system of the invention can easily distinguish between such sources by, for instance, having different sources encode different lines of the video signal or by the use of appropriate preamble codes for different types of sources.

What is claimed:

1. An in-station system for automatically encoding and monitoring the transmission of television programs at a television station, said station having a video library management system, comprising, at the station:
    an input video player for playing a recorded Storage medium containing a program received at the station;
    an encoder coupled to the output of said video player for encoding the video information signal of said received program with identifying data;
    a video recorder coupled to said encoder for recording said encoded program onto a video storage medium compatible with the station's video library management system;
    database means for storing information concerning the recorded encoded programs;
    a tuner/decoder for receiving the programs transmitted by such station and for detecting the presence of such identifying data on the video information signal of said received programs; and
    means for storing information concerning the identity and transmission of encoded programs in said database means.

2. The in-station system of claim 1 wherein said encoder includes means for selecting a line in the overscan region of the video information signal for encoding with such identifying data.

3. The in-station system of claim 2 wherein said selected line is between lines 10 and 20 of the video signal.

4. The in-station system of claim 2 wherein said preselected line is in the vertical blanking interval.

5. The in-station system of claim 2 wherein said decoder includes means for locating such identifying data on a scan line occurring between pre-determined scan lines of the composite video information signal of said received programs.

6. The in-station system of claim 1 wherein said decoder includes means for determining and storing a quality index indicative of the quality of the received video signal of such encoded programs.

7. The in-station system of claim 6 wherein said decoder includes means responsive to the absence of encoded information on up to a pre-determined number of consecutive fields of an encoded program for reducing the quality index associated with such encoded program.

8. In a system for automatically monitoring and verifying the transmission of television programs by a television station having a video library management system, an in-station method of encoding such programs comprising the steps performed at the station of:
    receiving programs to be broadcast by such station;
    dubbing such received programs onto a storage medium compatible with such video library management system;
    encoding the video portion of such received programs with an identifying code simultaneously with the dubbing of such program onto said medium and
    storing information concerning said dubbed encoded programs in database means at the station.

9. In the system of claim 8, the method for verifying the transmission of such encoded programs by such station comprising:
    receiving at the station the video portion of the encoded programs being transmitted by said station;
    detecting and decoding at the station the identifying code encoded on the video portion of such received encoded programs;
    storing information concerning the identity and transmission of the encoded programs in said database means for transmission to a host computer.

10. The method of claim 9 wherein said receiving, detecting and decoding of the encoded programs is performed at the transmitting station.

11. The method of claim 9 wherein said station is a broadcast station and wherein the receiving of the video portion of the encoded programs is performed by monitoring the signal broadcast by said station at a tap at the broadcast antenna of said station.

12. The method of claim 8 wherein the information encoded on said preselected line is the same on both fields of the frame of the video portion of tire encoded program.

13. The method of claim 8 wherein said identifying code is encoded on a selected line in the overscan portion of the video information signal and wherein different information is encoded on the said preselected line of the odd field from that encoded on the said preselected line of even field of each frame of the video portion of the encoded program and wherein the information encoded in one field of a program remains substantially invariant while the information encoded in the other field changes continually throughout the encoded program.

14. The method of claim 8 wherein the identifying code is encoded on 8 preselected line of the video portion of the encoded program and wherein such code occupies less than the full available space on said preselected line and is recorded on a central portion of said preselected line.

15. The method of claim 9 wherein said identifying code includes a cyclic redundancy check byte and further including checking each received identifying code for error upon detection and decoding.

16. The method of claim 9 further including determining a quality index for each received encoded program, based on the quality of the received video portion of said program.

17. The method of claim 9 wherein said step of detecting and decoding the identifying code includes:
searching each line of the field of a received program between pre-determined lines for determining the presence of an identifying code on one of such lines.

18. The method of claim 8 wherein said preselected line is between lines 10 and 20 of the video portion of the encoded program.

19. The method of claim 8 wherein said preselected line is in the vertical blanking interval.

20. An in-station system for automatically encoding and monitoring the transmission of television programs by a station having a video management system, comprising at the station:
means for encoding programs received at said station with identifying information and for dubbing the encoded programs to a storage medium compatible with the video library management system;
means for receiving the video signal of programs transmitted by said station;
means for detecting the presence of said identifying information on said video signal;
means for separating said identifying information from said received video signal; and
data base means for storing information concerning the identity and transmission of said encoded programs.

21. The system of claim 20 wherein said encoding means includes means for encoding a line of the overscan portion of the video signal of such received program.

22. The in-station system of claim 21 wherein said encoded line is in the vertical blanking interval.

23. The in-station system of claim 20 wherein said means for detecting the presence of an identifying code includes means for searching the fields of the received video signals between preselected lines of said video signal for detecting the presence of an identifying code.

24. The in-station system of claim 20 including means for generating quality index for each encoded program based on the quality of the video signal for such program.

25. The in-station system of claim 20 wherein said means for receiving the video signal is located at said station premises.

26. The system of claim 20 wherein said station is a broadcast station and said means for receiving the video signal includes a tap at the broadcast antenna of said station.

27. The in-station system of claim 1 further including:
means for coupling said database means to a remote host computer for transmitting information stored in such database means to said host.

* * * * *

UNITED STATES PATENT AND TRADEMARK OFFICE
CERTIFICATE OF CORRECTION

PATENT NO. : 5,450,122

DATED : September 12, 1995

INVENTOR(S) : Leonard D. Keene

It is certified that error appears in the above-identified patent and that said Letters Patent is hereby corrected as shown below:

Col. 12, line 12, "lon" should be --on--.

Col. 13, line 25, "turner" should be --tuner--.

Col. 14, line 9, "137. the" should be --137, the--.

Col. 14, line 19, "time the" should be --time. The--.

Col. 16, line 4, "clapable" should be --capable--.

Col. 17, claim 1, line 37 "Storage" should be --storage--.

Col. 18, claim 12, line 48, "tire" should be --the--.
Col. 18, claim 14, line 62, "8 preselected" should be --a preselected--.

Signed and Sealed this

Twenty-first Day of May, 1996

*Attest:*

BRUCE LEHMAN

*Attesting Officer*  *Commissioner of Patents and Trademarks*